United States Patent [19]

Ikeda et al.

[11] Patent Number: 4,646,110

[45] Date of Patent: Feb. 24, 1987

[54] LIQUID INJECTION RECORDING APPARATUS

[75] Inventors: Masami Ikeda; Seiichi Aoki, both of Machida; Akio Saito, Zama; Tadayoshi Inamoto, Hiratsuka; Katsuyuki Yokoi, Sagamihara, all of Japan

[73] Assignee: Canon Kabushiki Kaisha, Tokyo, Japan

[21] Appl. No.: 564,412

[22] Filed: Dec. 22, 1983

[30] Foreign Application Priority Data

Dec. 29, 1982 [JP] Japan ............................... 57-231522
Dec. 29, 1982 [JP] Japan ............................... 57-231523

[51] Int. Cl.$^4$ ............................................ G01D 15/18
[52] U.S. Cl. ................................................ 346/140 R
[58] Field of Search ......................................... 346/140

[56] References Cited

U.S. PATENT DOCUMENTS

| | | | |
|---|---|---|---|
| 3,747,120 | 7/1973 | Stemme | 346/140 X |
| 4,045,801 | 8/1977 | Iwasaki | 346/140 |
| 4,251,824 | 2/1981 | Hara | 346/140 |
| 4,296,421 | 10/1981 | Hara | 346/140 |
| 4,395,287 | 7/1983 | Kobayashi | 346/140 X |

*Primary Examiner*—Joseph W. Hartary
*Attorney, Agent, or Firm*—Fitzpatrick, Cella, Harper & Scinto

[57] ABSTRACT

A liquid injection recording apparatus having an orifice for discharging liquid and forming flying drops of liquid, a liquid flow path communicating with the orifice, and flying liquid drop forming means for forming flying drops of liquid from the orifice is provided with a discharge energy adjusting portion having a bubble generating portion communicating with the liquid flow path and means for causing bubbles to be generated in the bubble generating portion.

15 Claims, 18 Drawing Figures

LIQUID INJECTION RECORDING APPARATUS

BACKGROUND OF THE INVENTION

1. Field of the Invention

This invention relates to a liquid injection recording apparatus, and more particularly to a liquid injection recording apparatus which can accomplish harmonious recording.

2. Description of the Prior Art

Non-impact recording methods have recently been attracting attention in that noise occurring during recording is negligible. Among them, the so-called ink jet recording method (or liquid injection recording method) which is capable of effecting high-speed recording without requiring special processing such as fixation on plain paper is a very effective recording method, and heretofore various types of such method have been proposed and apparatuses embodying them have been to devises some of which have already been commercialized and some of which are still being studied in order that they may be put into practical use.

Among them, the liquid injection recording methods disclosed, for example, in Japanese Laid-open Patent Application No. 51837/1979 and German Laid-open Patent Application (DOLS) No. 2843064 have a feature different from other liquid injection recording methods in that heat energy is caused to act on liquid to thereby obtain a generative power for discharging drops of liquid.

That is, in the recording methods disclosed in the aforementioned publications, the liquid acted on by the heat energy undergoes a state change involving a sharp increase in volume and, by the force resulting from such state change, drops of liquid are discharged and fly from an orifice provided at the tip end of the recording head portion and adhere to a recording medium, thus accomplishing recording.

Particularly, the liquid injection recording method disclosed in DOLS No. 2843064 can not only be very effectively applied to the so-called drop-on demand recording method, but also has an advantage that it readily permits the provision of high-density multiorifice recording heads across a full line width, and therefore images of high resolution and high quality can be obtained at a high speed.

Thus, the above-mentioned liquid injection recording method has various advantages, but when it is desired to record images of higher resolution and higher quality, it is necessary to endow recorded picture elements with harmony and effect image recording including half-tone information.

As a first one of such image recording methods having tone controllability, there is a recording method in which a picture element is divided into a matrix-like form in a plurality of cells each of which can be occupied only by one of image forming element and harmony of a desired level is digitally expressed in conformity with the number of cells occupied by the image forming elements, of those cells made into the matrix-like form, and the arrangement condition of the image forming elements which occupy the cells. As a second method, there is a recording method in which a picture element is constituted by only one image forming elements and a desired expression of harmony is effected analogously by changing the optical density of the image forming element.

However, in an ink jet recording head which effects recording with liquid caused to be discharged by heat energy, if the first tone control method is resorted to, the area of one picture element itself will become great and this is liable to result in a reduction in sharpness, etc. Also, the fact that this method uses digital control makes the tone steps rough, and this has led to a problem that the quality of image lacks delicacy. The second tone control method is generally a method of varying electrical energy for increasing the size of drops of liquid discharged and thereby varying the size of a picture element, namely, an image forming element. This method, however, has suffered from the problems that the control range of harmony is narrow and a sufficient tone control range cannot be obtained and that there occurs unsatisfactory discharging of the recording head and reduced reliability of the head.

SUMMARY OF THE INVENTION

The present invention has been made in view of the above-noted points and an object thereof is to provide a liquid injection recording apparatus which is capable of accomplishing delicate tone expression over a wide density range from high optical density to low optical density.

It is another object of the present invention to provide a liquid injection recording apparatus in which the reliability of the electro-thermal converting member and recording head and the stability of discharge of drops of liquid has been improved.

It is still another object of the present invention to provide a liquid injection recording apparatus in which the irregularity of the discharge characteristic resulting from the irregularity of manufacture has been simply eliminated to improve the yield.

It is also an object of the present invention to provide a liquid injection recording apparatus which has an orifice the discharging liquid and forming flying drops of liquid, a liquid flow path communicating with the orifice, and flying liquid drop forming means for forming flying drops of liquid from the orifice and which is provided with a discharge energy adjusting portion having a bubble generating portion communicating with the liquid from path and means for causing bubbles to be generated in the bubble generating portion.

It is also an object of the present invention to provide a liquid injection recording apparatus which has an orifice for discharging liquid and forming flying drops of liquid, a liquid flow path communicating with the orifice, and flying liquid drop forming means for gererating energy for causing the liquid to be discharged from the orifice and which is provided with a discharge energy adjusting portion having a bubble generating portion communicating with the liquid flow path through a flow path on the one hand and communicating with a small opening on the other hand and means for causing bubbles to be generated in the bubble generating portion.

The invention will become fully apparent from the following detailed description thereof taken in conjunction with the accompanying drawings.

DETAILED DESCRIPTION OF THE PREFERRED EMBODIMENTS

The invention will hereinafter be described in more detail by reference to the drawings.

Figure 1A:
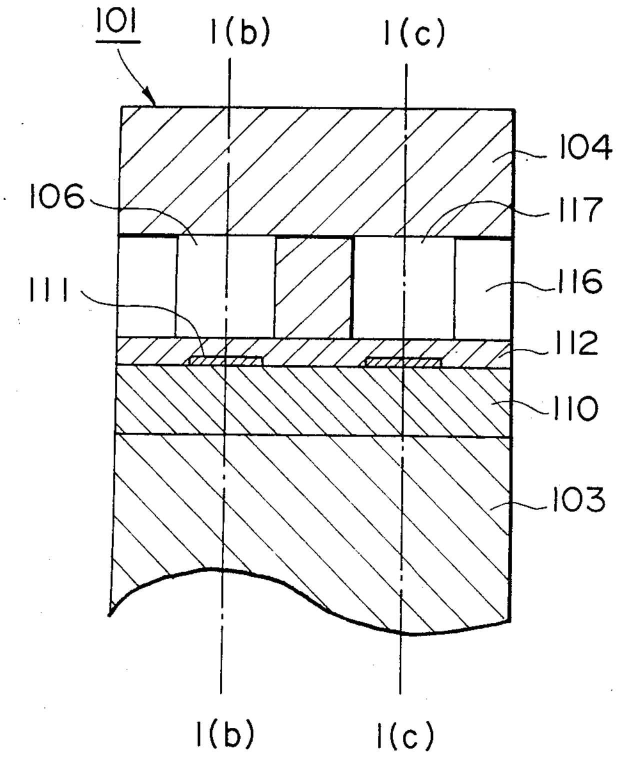
FIGS. 1A to 1C illustrate the construction of a first embodiment of the recording head portion of the present invention, FIG. 1A being a fragmentary front sectional view and FIGS. 1B and 1C being fragmentary transverse cross-sectional views.
Figure 1B:
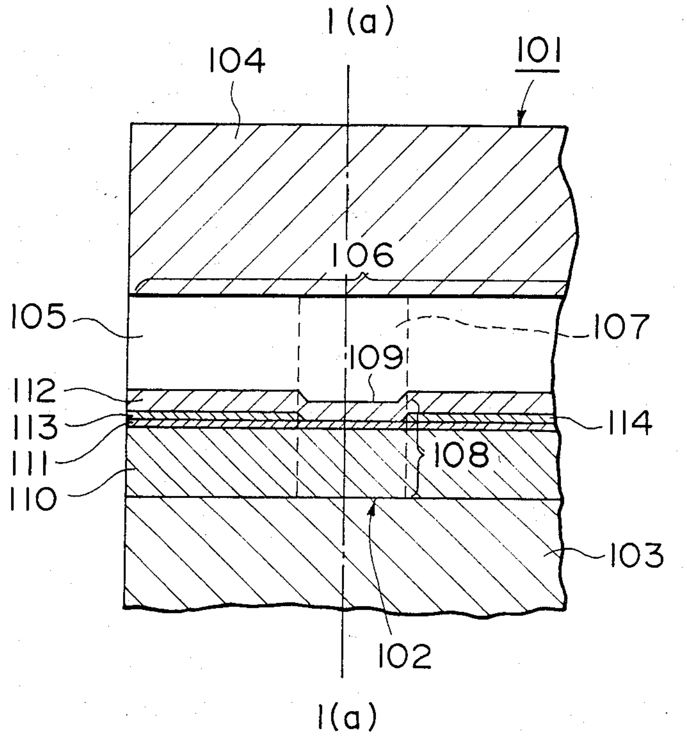
Figure 1C:
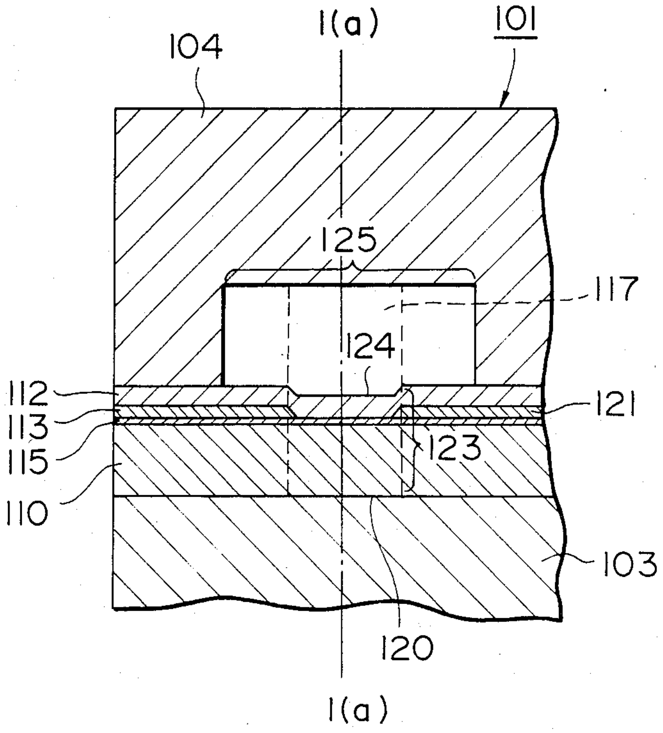

FIG. 1A is a fragmentary front sectional view of a liquid injection recording head, to which the present invention is applied, taken along a plane parallel to the orifice surface of the head [taken along a dot-and-dash line 1(*a*)—1(*a*) indicated in FIGS. 1B and 1C], and FIG. 1B is a fragmentary cross-sectional view taken along a dot-and-dash line 1(*b*)—1(*b*) indicated in FIG. 1A. FIG 1C is a fragmentary cross-sectional view taken along a dot-and-dash line 1(*c*)—1(*c*) indicated in FIG. 1A.

The recording head 101 shown is of a structure in which grooved plates 104 and 116 each provided with a predetermined number of grooves of predetermined width and depth at a predetermined line density are joined to the surface of a base plate 103 on the surface of which is provided an electro-thermal converting member 111, so as to cover the surface of the base plate 103, whereby an orifice 105 and a liquid discharge portion 106 are formed. The liquid discharge portion 106 has at the terminal end thereof the orifice 105 for causing drops of liquid to be discharged, and a thermal acting portion 107 in which heat energy generated by the electro-thermal converting member 111 acts on liquid to create bubbles and induce a sharp state change due to the expansion and contraction of the volume thereof.

The thermal acting portion 107 overlies the heat generating portion 108 of the electro-thermal converting member 111 and has as its bottom surface the thermal acting surface 109 of the heat generating portion 108 which contacts the liquid.

The heat generating portion 108 comprises a lower layer 110 provided on the base plate 103, the electro-thermal converting member 111 provided on the lower layer 110, and an upper layer 112 provided on the electro-thermal converting member 111. Electrodes 113 and 114 for supplying electric power to the electro-thermal converting member 111 to generate heat are provided on the surface of the converting member 111. The electrode 113 is common to the heat generating portions of the liquid discharge portions, and the electrode 114 is a selecting electrode for selecting the heat generating portions of the liquid discharge portions to cause them to generate heat, the electrode 114 being provided along the flow path of the liquid discharge portion.

The upper layer 112 functions to protect the electro-thermal converting member 111, that is, it isolates the electro-thermal converting member 111 from the liquid in the liquid discharge portion 106 to chemically and physically protect the electro-thermal converting member 111 from the liquid used and also prevents the electrodes 113 and 114 from being short-circuited through the liquid.

The upper layer 112, which has the above-described function, need not always be provided where the electro-thermal converting member 111 has a liquid-resisting property and there is no possibility that the electrodes 113 and 114 are electrically short-circuited through the liquid, and in such a case, the electro-thermal converting member 111 may be designed as a structure in which liquid directly contacts the surface of the electro-thermal converting member.

The lower layer 110 functions chiefly to control the heat flow rate. That is, the lower layer 110 is provided in order that during the discharge of drops of liquid, the rate at which the heat generated by the electro-thermal converting member 111 is conducted toward the thermal acting portion 107 may be as much higher as possible than the rate at which such heat is conducted toward the base plate 103 and that, after the discharge of drops of liquid, namely, after the supply of power to the electro-thermal converting member 111 has been cut off, the heat in the thermal acting portion 107 and the heat generating portion 108 may be quickly emitted toward the base plate 103 to quickly cool the liquid in the thermal acting portion 107 and the bubbles created.

In the liquid injection recording head as described above, by an electrical signal being input to the electro-thermal converting member 111 by ON-OFF operation, the liquid is gasified on the thermal acting surface 109 to create effective bubbles and at the same time, the pressure P in the liquid discharge portion 106 increases with an increase in the volume of bubbles and thus, drops of liquid fly from the orifice.

To vary the size D of the flying drops of liquid to effect the tone control of recording onto recording paper, there is a method of adjusting the volume V of the bubbles created on the thermal acting portion 109 and controlling the discharge energy. However, when the discharge energy assumes a value less than a certain value (determined by the conditions of the apparatus, etc.), unnecessary bubbles will stagnate in the liquid discharge portion 106 and the liquid flow path, thus causing instability of liquid discharge. Further, the liquid discharge will be stopped.

Therefore, a discharge energy adjusting portion 125 which is in communication with the liquid discharge portion 106 and which is provided with a bubble generating portion 117 and a bubble generating member 120 is provided to cause the pressure P developed in the liquid discharge portion 106 by the bubbles generated on the thermal acting surface 109 to be absorbed by bubbles generated in the bubble generating portion 117, to thereby reduce the discharge energy and effect the tone control.

The bubble generating portion 117 is comprised of the lower layer 110 provided on the base plate 103, the electro-thermal converting member 115 provided on the lower layer 110, the upper layer 112 provided on the electro-thermal converting member 115, and the grooved plate 104. Electrodes 113 and 121 for supplying electric power to the electro-thermal converting member 115 to generate heat are provided on the surface of the electro-thermal converting member 115.

The bubble generating portion 117 has as one surface thereof a thermal acting surface 124 which contacts the liquid in the heat generating portion 123 of the electro-thermal converting member 115. The upper layer 112 is not required if there is no possibility of liquid leakage or no possibility of the electrodes being short-circuited.

In the liquid injection recording head of the above-described construction, by an electrical signal being input to the electro-thermal converting member 115 by ON-OFF operation, the liquid is gasified on the thermal acting surface 124 to create bubbles. If an electrical signal for the discharge of drops of liquid is input to the electro-thermal converting member 111 during the time $t_0-t$ during which the bubbles are present, drops of liquid different in size correspondingly to the time $t_0-t$ will be discharged.

Figure 2A:
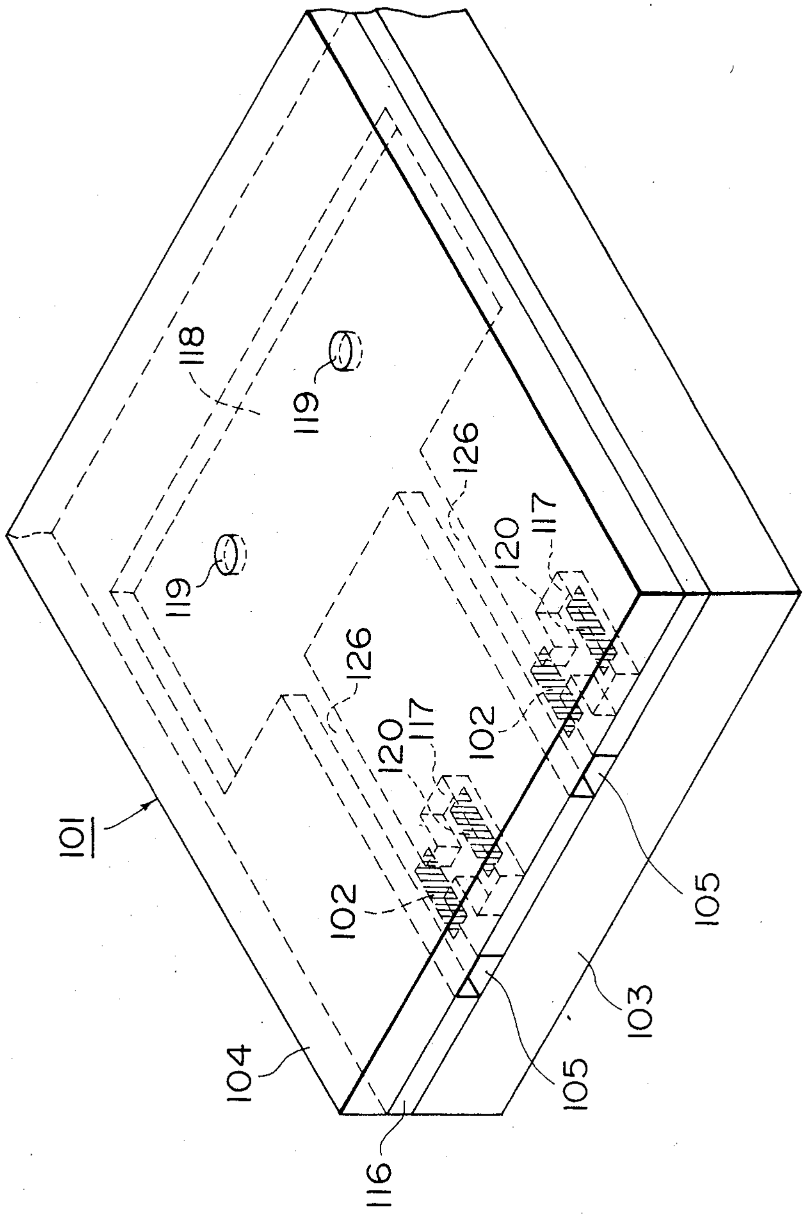
FIGS. 2A to 2C are schematic perspective views of different recording head portion according to first, second and third embodiments of the invention.

FIG. 2A is a schematic perspective view of a recording head 101 for illustrating a first embodiment of the present invention. In FIG. 2A, reference numeral 118 designates a liquid supply chamber, reference numeral 126 denotes liquid flow paths, and reference numeral 119 designates through-holes for connecting liquid supply pipes (not shown).

As shown, in the present embodiment, an orifice 105 is provided at the terminal end of each liquid flow path 126 communicating with the liquid supply chamber 118, and a fine flow path communicating with a bubble generating portion 117 is provided in the portion of each liquid flow path 126 between the liquid supply chamber 118 and the orifice 105. Bubble generating members 102 are for discharging drops of liquid and are provided in the liquid flow paths 126, and bubble generating members 120 are provided in the bubble generating portions 117.

Figure 2B:
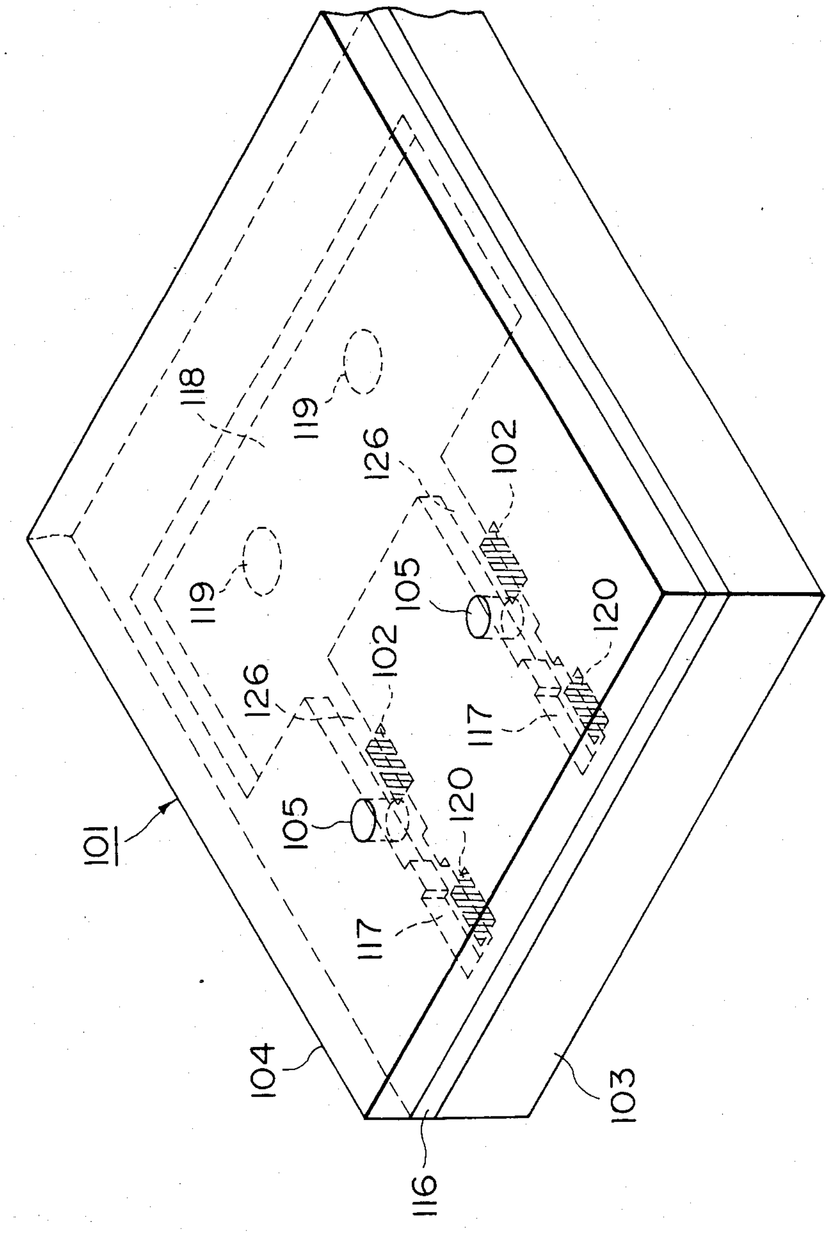

FIG. 2B is a schematic perspective view of a recording head 101 according to a second embodiment of the present invention. In FIG. 2B, reference numerals are similar in significance to those in FIG. 2A. In the present embodiment, a bubble generating member 102 and an orifice 105 are provided in the intermediate portion of each liquid flow path 126 which is in communication with the liquid supply chamber 118, and a bubble generating portion 117 communicating with the liquid supply chamber through a fine flow path is provided at the terminal end of each liquid flow path 126. A bubble generating member 120 is provided in each bubble generating portion 117. In the present embodiment, as shown, each orifice 105 is provided so that the direction of discharge of drops of liquid is perpendicular to the direction of supply of liquid.

Figure 2C:
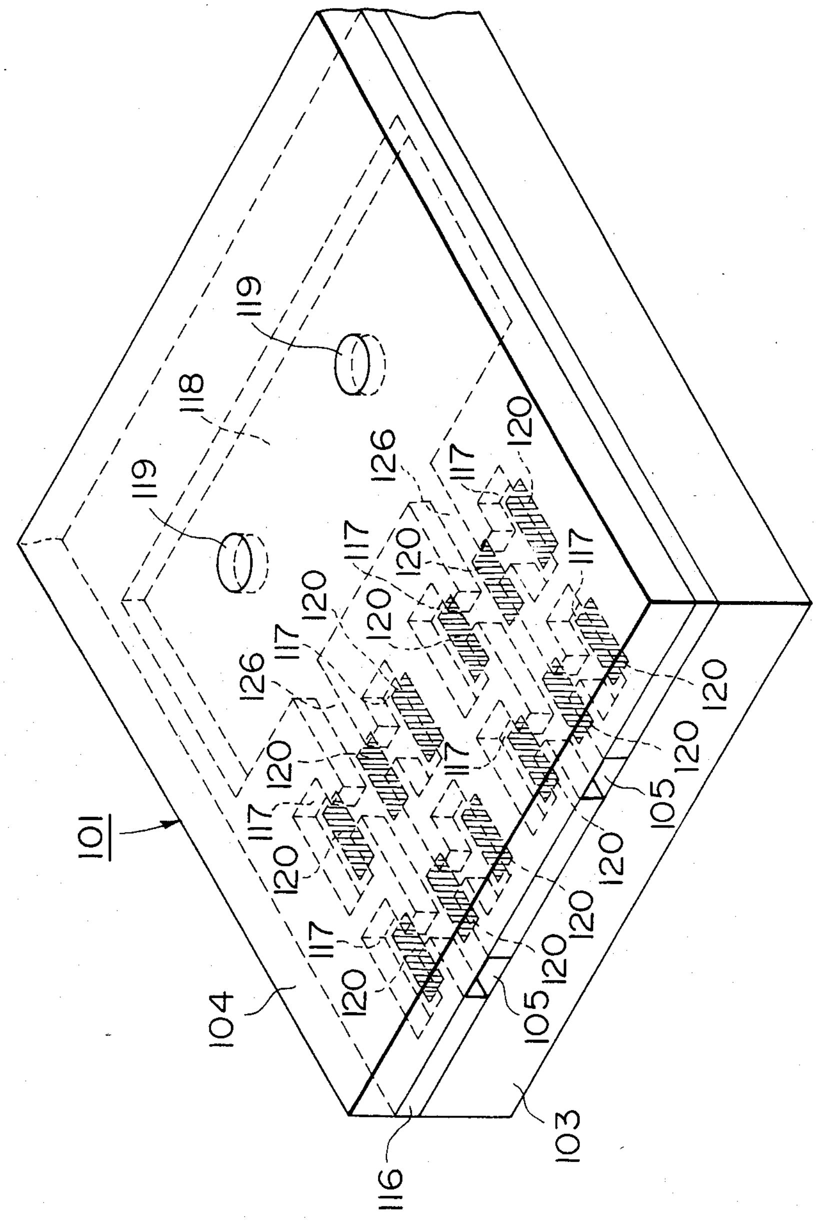

FIG. 2C is a schematic perspective view of a recording head 101 according to a third embodiment of the present invention. In FIG. 2C, reference numerals are similar in significance to those in FIGS. 2A and 2B. The present embodiment is identical in basic construction to the embodiment of FIG. 1A, with the exception that a plurality of bubble generating portions 117 are provided. That is, in FIG. 2C, an orifice 105 is provided at the terminal end of each liquid flow path 126 communicating with the liquid supply chamber 118, and four bubble generating portions 117 communicating with four independent fine flow paths, respectively, are provided in the intermediate portion of each liquid flow path 126.

The first to third embodiments are similar in the manner in which basic control of the liquid discharge is effected, that is, liquid supplied from the liquid supply chamber 118 is heated by the bubble generating members 102, whereby bubbles are created to develop a pressure and drops of liquid are discharged from the orifices 105. Alternatively, power is first supplied to the bubble generating members 120 in the bubble generating portions 117 to cause bubbles to be created in the bubble generating portions 117, whereafter power is supplied to the bubble generating members 102 to cause bubbles to be created in the liquid flow paths 126 and drops of liquid are discharged from the orifices 105. In the latter case, the pressure for causing the drops of liquid to be discharged from the orifices 105 (the discharge pressure) can be varied over a wide range by controlling the pressure of the bubbles generated in the liquid flow paths 126 by the bubbles generated in the bubble generating portions 117. Accordingly, the size of the discharged drops of liquid is varied by the discharge pressure and therefore, density control in a wide range can be effected on a recording medium.

Even in the second embodiment wherein the direction of discharge of drops of liquid is perpendicular to the direction of supply of liquid, a number of bubble generating portions 117 for controlling the discharge energy can be provided as in the third embodiment. Further, in the third embodiment, one bubble generating member 102 is provided for two bubble generating portions 117 which control the discharge energy, but the bubble generating member 102 for the discharge of drops of liquid may be provided correspondingly to the amount of control of the discharge energy, and one bubble generating member 102 for two bubble generating portions 117 as shown is not restrictive and the provision of four bubble generating portions 117 for one orifice 105 is neither restrictive. Also, the cross-sectional area and length of the fine flow paths communicating the liquid flow paths 126 with the bubble generating portions 117 and the volume of the bubble generating portions 117 are determined to such values as will ensure the best record images to be obtained, in view of the degree of liquid discharged, the amount of heat generated by the bubble generating members 120 and 102, the amount of control of the recording density, the number of bubble generating portions installed, and other numerous conditions. However, at least such dimensions that drops of liquid are not discharged from the orifices 105 by the pressure of the bubbles generated by the bubble generating portions 117 are selected.

The present invention will now be described with respect to a fourth embodiment thereof.

Figure 5A:
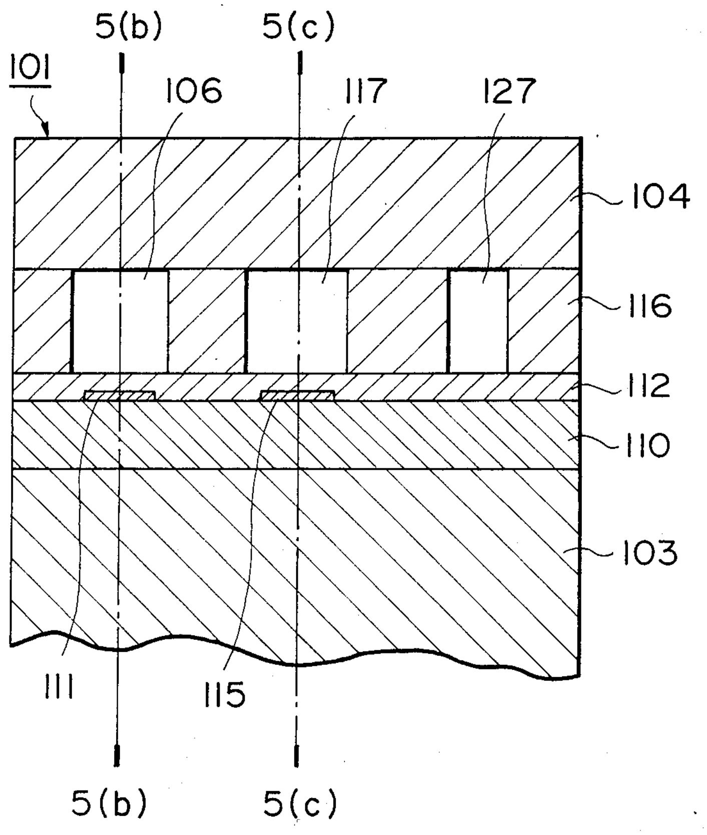
FIGS. 5A to 5C illustrate the construction of a fourth embodiment of the recording head portion of the present invention, FIG. 5A being a fragmentary front sectional view and FIGS. 5B and 5C being fragmentary transvers cross-sectional views.
Figure 5B:
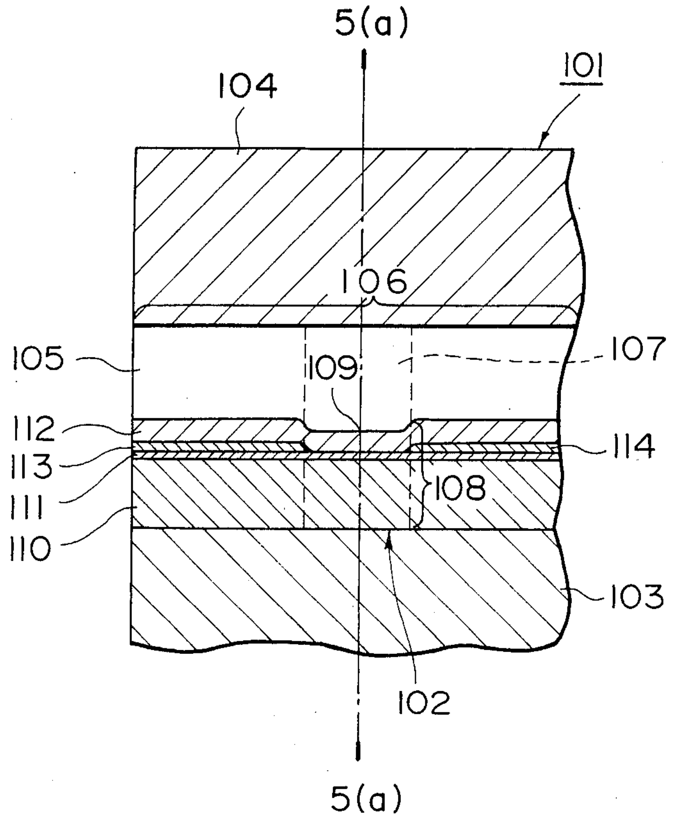
Figure 5C:
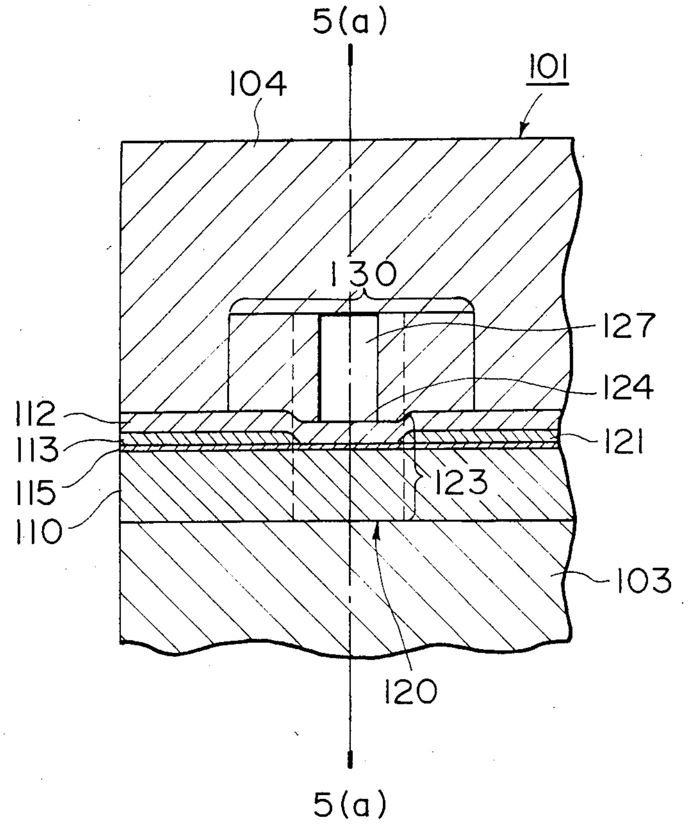

FIG. 5A is a fragmentary front sectional view of a liquid injection recording head to which the present invention is applied, taken along a plane parallel to the orifice surface of the head [taken along a dot-and-dash line 5(*a*)—5(*a*) indicated in FIGS. 5B and 5C], and FIG. 5B is a fragmentary cross-sectional view taken along a dot-and-dash line 5(*b*)—5(*b*) indicated in FIG. 5A.

FIG. 5C is a fragmentary cross-sectional view taken along a dot-and-dash line 5(*c*)—5(*c*) indicated in FIG. 5A.

The recording head 101 shown is of a structure in which grooved plates 104 and 116 each provided with a predetermined number of grooves of predetermined width and depth at a predetermined line density are joined to the surface of a base plate 103 on the surface of which is provided an electro-thermal converting member 111, so as to cover the surface of the base plate 103, whereby an orifice 105 and a liquid discharge portion 106 are formed. The liquid discharge portion 106 has at the terminal end thereof the orifice 105 for causing drops of liquid to be discharged, and a thermal acting portion 107 in which heat energy generated by the electro-thermal converting member 111 acts on liquid to create bubbles and induce a sharp state change due to the expansion and contraction of the volume thereof.

The thermal acting portion 107 overlies the heat generating portion 108 of the electro-thermal converting member 111 and has as its bottom surface the thermal acting surface 109 of the heat generating portion 108 which contacts the liquid.

The heat generating portion 108 comprises a lower layer 110 provided on the base plate 103, the electro-thermal converting member 111 provided on the lower layer 110, and an upper layer 112 provided on the electro-thermal converting member 111. Electrodes 113 and 114 for supplying electric power to the electro-thermal converting member 111 to generate heat are provided on the surface of the electro-thermal converting member 111. The electrode 113 is common to the heat generating portions of the liquid discharge portions, and the electrode 114 is a selecting electrode for selecting the heat generating portions of the liquid discharge portions to cause them to generate heat, the electrode 114 being provided along the flow path of the liquid discharge portion.

The upper layer 112 functions to protect the electro-thermal converting member 111, that is, it isolates the electro-thermal converting member 111 from the liquid in the liquid discharge portion 106 to chemically and physically protect the electro-thermal converting member 111 from the liquid used and also prevents the electrodes 113 and 114 from being short-circuited through the liquid.

The upper layer 112, which has the above-described function, need not always be provided where the electro-thermal converting member 111 has a liquid-resisting property and there is no possibility that the electrodes 113 and 114 are electrically short-circuited through the liquid, and in such a case, the electro-thermal converting member 111 may be designed as a structure in which liquid directly contacts the surface of the electro-thermal converting member.

The lower layer 110 functions chiefly to control the heat flow rate. That is, the lower layer 110 is provided in order that during the discharge of drops of liquid, the rate at which the heat generated by the electro-thermal converting member 111 is conducted toward the thermal acting portion 107 may be as much higher as possible than the rate at which such heat is conducted toward the base plate 103 and that, after the discharge of drops of liquid, namely, after the supply of power to the electro-thermal converting member 111 has been cut off, the heat in the thermal acting portion 107 and the heat generating portion 108 may be quickly emitted toward the base plate 103 to quickly cool the liquid in the thermal acting portion and the bubbles created.

In the liquid injection recording head as described above, by an electrical signal being input to the electro-thermal converting member 111 by ON-OFF operation, the liquid is gasified on the thermal acting surface 109 to create effective bubbles and at the same time, the pressure P in the liquid discharge portion 106 increases with an increase in the volume of bubbles and thus, drops of liquid fly from the orifice.

To vary the size D of the flying drops of liquid to effect the tone control of recording onto recording paper, there is a method of adjusting the volume V of the bubbles created on the thermal acting portion 109 and controlling the discharge energy. However, when the discharge energy assumes a value less than a certain value (determined by the conditions of the apparatus, etc.), unnecessary bubbles will stagnate in the liquid discharge portion 106 and the liquid flow path, thus causing instability of liquid discharge. Further, the liquid discharge will be stopped.

Therefore, as shown, a flow path (relay flow path) 129 communicating with the liquid discharge portion 106 and provided to alleviate the discharge energy, and a discharge energy adjusting chamber 125 communicating with the flow path 129 and provided with a bubble generating portion 117, an electro-thermal converting member 115 and a fine flow path 127 having at the terminal end thereof a small opening which opens into the atmosphere are provided in the recording head portion. When a pressure is applied to the flow path 129, the fine flow path 127 and the small opening provided at the terminal end of the fine flow path 127 by the bubbles generated on the thermal acting surface 124, the discharge energy which causes drops of liquid to be discharged from the orifice 105 is controlled by the bubbles generated by the electro-thermal converting member 111 and thus, tone control is effected.

The aforementioned bubble generating portion, as shown in FIG. 5C, comprises the lower layer 110 provided on the base plate 103, the upper layer 112 provided on the lower layer 110, and grooved plates 114 and 116. Electrodes 113 and 121 for supplying electric power to the electro-thermal converting member 115 to generate heat are provided on the surface of the electro-thermal converting member 115. In the bubble generating portion 117, heat is conducted to the liquid by the thermal acting surface 124 which overlies the heat generating portion 123 of the electro-thermal converting member 115 and contacts the liquid in the heat generating portion 123, whereby bubbles are created.

In the liquid injection recording apparatus of the above-described construction, by an electrical signal being input to the electro-thermal converting member 115 by ON-OFF operation, the liquid is gasified on the thermal acting surface 124 to create bubbles. If an electrical signal for the discharge of drops of liquid is input to the electro-thermal converting member 111 during the time $t_0$—t during which the bubbles are present, the discharge energy of drops of liquid will be adjusted correspondingly to the time $t_0$—t and predetermined tone control will be effected and thus, an image will be recorded.

Figure 6A:
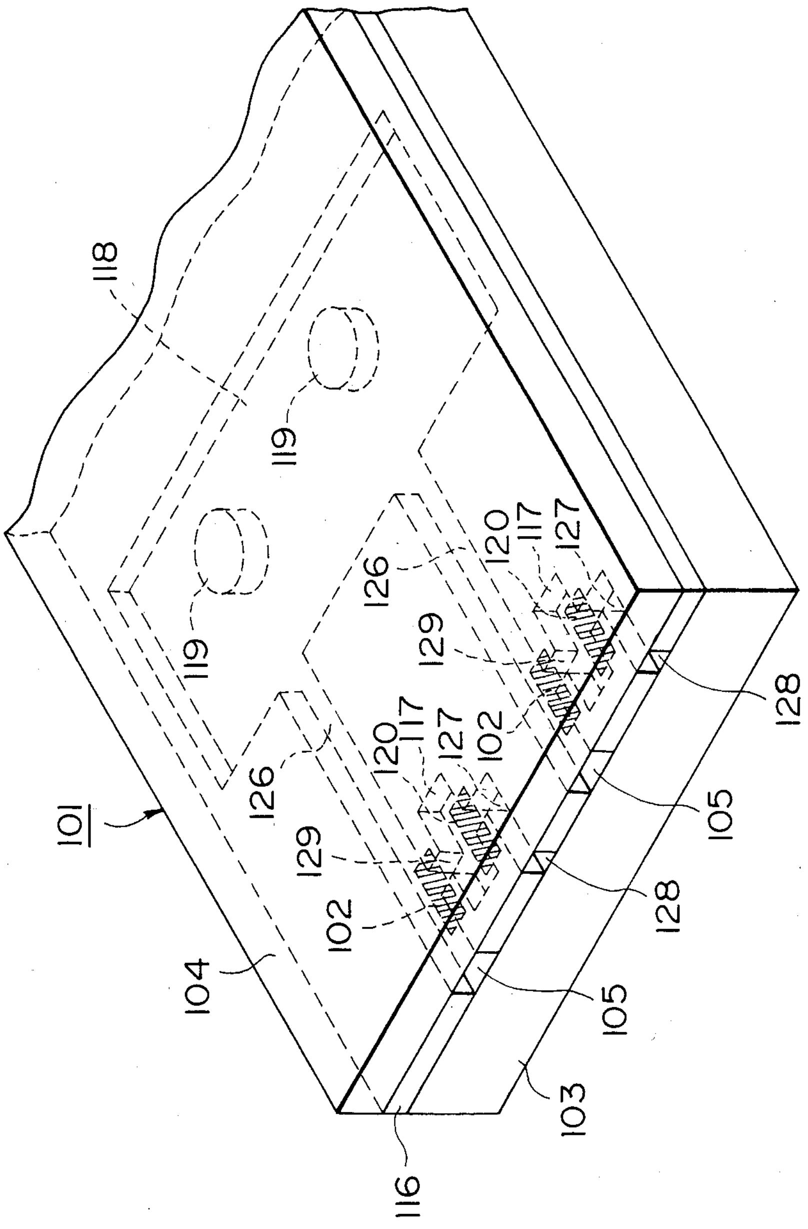
FIGS. 6A to 6C are schematic perspective views of different recording head portions according to fourth, fifth and sixth embodiments of the invention.

FIG. 6A is a schematic perspective view of the recording head 101 for illustrating the fourth embodiment of the present invention. In FIG. 6A, reference numeral 118 designates a liquid supply chamber, reference numeral 119 denotes through-holes for communicating liquid supply pipes (not shown) with the liquid supply chamber, and reference numeral 126 designates liquid flow paths.

As shown, in the present embodiment, an orifice 105 is provided at the terminal end of each liquid flow path 126 communicating with the liquid supply chamber 118, and a flow path 129 communicating with the bubble generating portion 117 and a fine flow path 127 communicating with the bubble generating portion 117 and having a small opening 128 at the terminal end opposite to the bubble generating portion 117 are provided in the intermediate portion of each liquid flow path 126 between the liquid supply chamber 118 and the orifice 105.

Bubble generating members 102 are for discharging drops of liquid and are provided in the liquid flow paths 126, and bubble generating members 120 are for adjusting the discharge energy and are provided in the bubble generating portions.

Figure 6B:
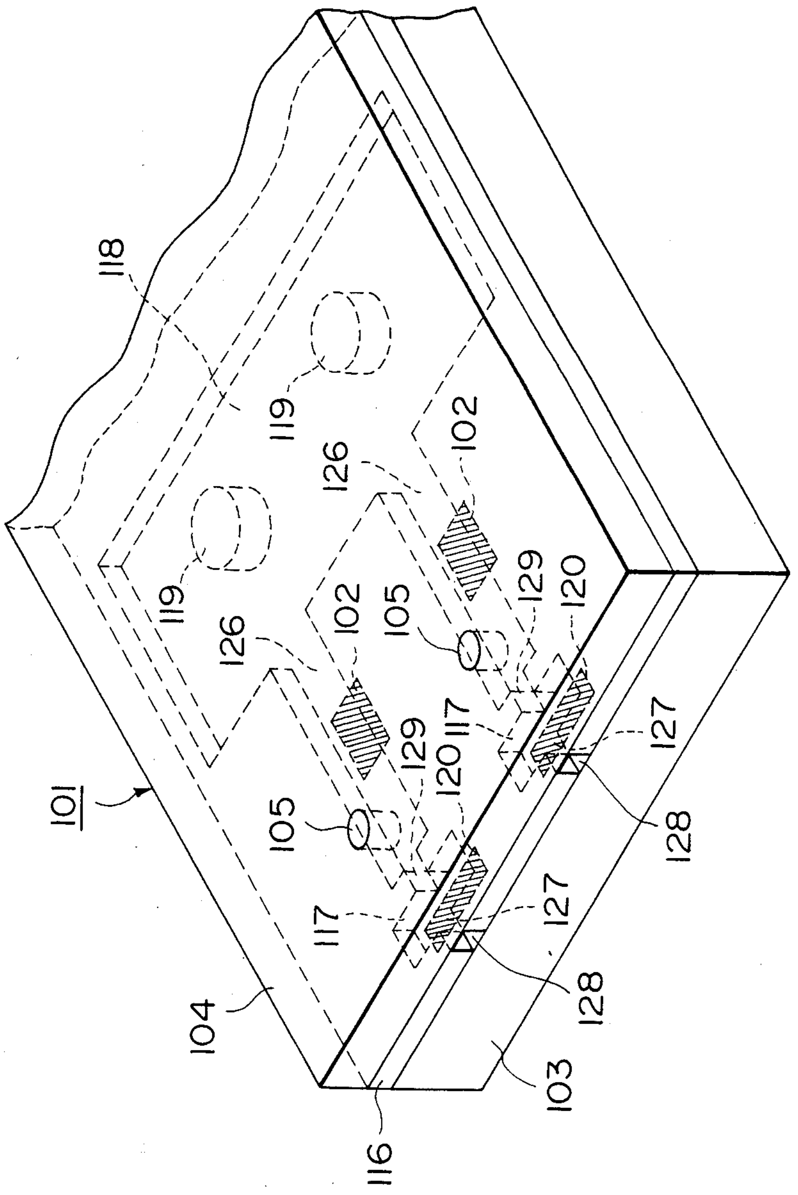

FIG. 6B is a schematic perspective view of a fifth embodiment of the present invention. In FIG. 6B, reference numerals are similar in significance to those in FIG. 6A. In this embodiment, a bubble generating member 102 and an orifice 105 are provided in the intermediate portion of each liquid flow path 126 communicating with a liquid supply chamber 118, and a flow path 129 communicating with the liquid flow path 126, a bubble generating portion 117 communicating with the flow path 129 and a fine flow path 127 communicating with the bubble generating portion 117 are provided at the terminal end portion of each liquid flow path 126 opposite to the liquid supply chamber, and a small opening 128 is provided at the terminal end of each fine flow path 127 opposite to the bubble generating portion 117.

Figure 6C:
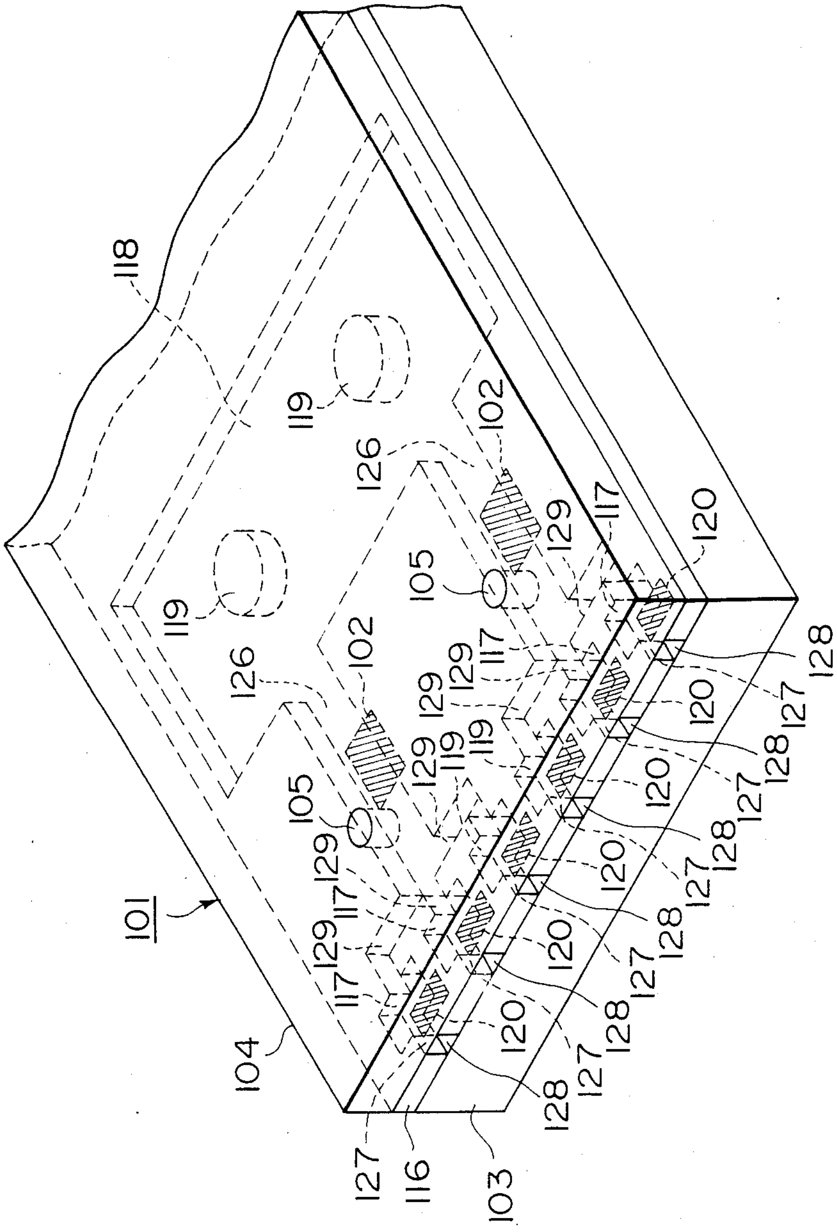

FIG. 6C is a schematic perspective view of a sixth embodiment of the present invention. In FIG. 6C, reference numerals are similar in significance to those in FIGS. 6A and 6B. This embodiment has the same basic construction as the embodiment of FIG. 5B with the exception that a plurality of bubble generating portions 117 and small openings 128 are provided. That is, in FIG. 6C, flow paths 129 are in communication with liquid flow paths 126 and a plurality of bubble generating portions 117, fine flow paths 127 and small openings 128 are provided.

The fourth to sixth embodiments are similar in the manner in which the basic control of the liquid discharge is effected, that is, the liquid supplied from the liquid supply chamber 118 is caused to generate bubbles by the bubble generating members 102 and develops a pressure which causes drops of liquid to be discharged from the orifices 105. Alternatively, power is first supplied to the bubble generating members 120 of the bubble generating portions 117 to cause bubbles to be generated in the bubble generating portions 117, whereafter power is supplied to the bubble generating members 102 to cause bubbles to be generated in the liquid flow paths 126, and the pressure for discharging drops of liquid (the discharge pressure) is controlled by the bubbles in the bubble generating portions 117 and drops of liquid are discharged from the orifices 105. The size of the drops of liquid discharged can be varied by the discharge pressure and therefore, density control in a wide range can be accomplished.

Even in a case where the direction of discharge of drops of liquid is the same as the direction of supply of liquid as in the fourth embodiment, a number of bubble generating portions 117 for controlling the discharge energy can be provided. Further, the provision of three bubble generating portions for one orifice 105 as in the sixth embodiment is not restrictive and the provision of three bubble generating portions for one bubble generating member 102 is neither restrictive.

The cross-sectional area and length of the flow paths 129 communicating the liquid flow paths 126 with the bubble generating portions 117, the cross-sectional area and length of the fine flow paths 127 communicating with the bubble generating portions 117 and of the small openings 128 formed at the terminal ends of the fine flow paths 127, and the volume of the bubble generating portions 117 are determined to such values which ensure the best recorded image to be obtained, in view of the kind of the liquid discharged, the amount of heat generated by the bubble generating members 120 and 102, the amount of control of the recording density, the number of bubble generating portions installed and other numerous conditions. However, at least such dimensions that the liquid is not discharged from the orifices 105 or from the small openings 128 by the pressure of the bubbles generated in the bubble generating portions 117 are selected.

The small openings 128 and orifices 105 may be provided either on the same surface side or in different surfaces. Also, the small openings 128, like the orifices 105, may open in a direction perpendicular to the direction of supply of liquid if they can control the pressure of the bubbles generated in the bubble generating portions 117.

According to the present invention, as described above, bubbles for adjusting the discharge energy can be generated to vary the size of the drops of liquid discharged, i.e., the dot size to thereby control the image tone widely. As a result, images of high resolution and high sharpness can be formed. Further, the stability of discharge of drops of liquid in an area of low optical density can also be improved. In addition, according to the present invention, the irregularity of the dot size resulting from the irregularity of the manufacture of the apparatus can also be adjusted by the bubbles for adjusting the discharge energy and thereby non-uniformity of the optical density can be eliminated.

That is, according to the present invention, there is provided an excellent liquid injection recording apparatus in which good control of the image tone can be accomplished.

The volume of the discharge energy adjusting chamber, the cross-sectional area, length and various dimensions of the fine flow paths, the small openings and the flow paths, and the volume of the electro-thermal converting members are determined to the best values in view of the kind of the liquid (ink) and other numerous conditions.

Too great a cross-sectional area of the flow paths may lead to the undesirable possibility that the pressure is transmitted from the discharge energy adjusting chamber side to the liquid flow paths to cause drops of liquid to fly from the orifices. Also, too great a cross-sectional area of the fine flow paths and of the small openings communicating with these fine flow paths may lead to the undesirable possibility that the pressure escapes from the small openings to force also the liquid in the adjusting chamber outwardly thereof.

Accordingly, these cross-sectional areas are suitably set so that even under a maximum necessary pressure, no drop of liquid is discharged from the orifices and no excess liquid is discharged from the small openings (the surface tension of the liquid in the small openings can overcome the pressure of the bubbles). Also, it is desirable that these cross-sectional areas be set so that an optimum pressure is applied to the liquid flow paths.

Further, if the cross-sectional areas of the flow paths, the fine flow paths and the small openings are too great, the energy for liquid discharge generated in the liquid flow paths will escape from the discharge energy adjusting chamber and in some cases, drops of liquid will be discharged from the small openings. The various dimensions must be determined with such factors also being taken into account.

The liquid drop discharging means need not always use electro-thermal converting members as described above, whereas the use of electro-thermal converting members is preferable from the viewpoint of the advantage that they can be formed simultaneously with the bubble generating means provided in the energy adjusting portion.

EXAMPLE 1

The recording head according to the first embodiment of the present invention could be made, for example, in the following manner.

First, a layer of $SiO_2$ (the lower layer) was formed to a thickness of 3 $\mu$m on a silicon substrate by sputtering, and subsequently, as the electro-thermal converting member, Hf $B_2$ was layered to a thickness of 1000 Å and as the electrode, aluminum was layered to a thickness of 3000 Å, whereafter an electro-thermal converting member pattern was formed by selective etching. Subsequently, as a protective layer (the upper layer), a layer of $SiO_2$ was formed to a thickness of 0.5 $\mu$m by sputtering and a heat generating portion was formed on the substrate, whereafter photosensitive resin was laminated on the substrate and the photosensitive resin was exposed to light and developed by a desired pattern, whereby liquid flow paths, a liquid supply chamber and a discharge energy adjusting portion were formed, and a glass plate provided with a through-hole having a diameter of 1 mm was joined thereto. Subsequently, the end surfaces of the orifices were polished so that the distance between the tip end of the heat generating resistance member and the orifices was 300 $\mu$m and thus, a recording head was completed.

An image was recorded and evaluated by applying a rectangular voltage pulse printing signal to the electro-thermal converting member while supplying ink composed chiefly of a black dye and ethanol to the thermal acting portion of this recording head under a back pressure of 0.01 atmospheric pressure.

With the first embodiment taken as an example, a specific tone control method by the liquid injection recording apparatus of the present invention will hereinafter be described.

Figure 3A:
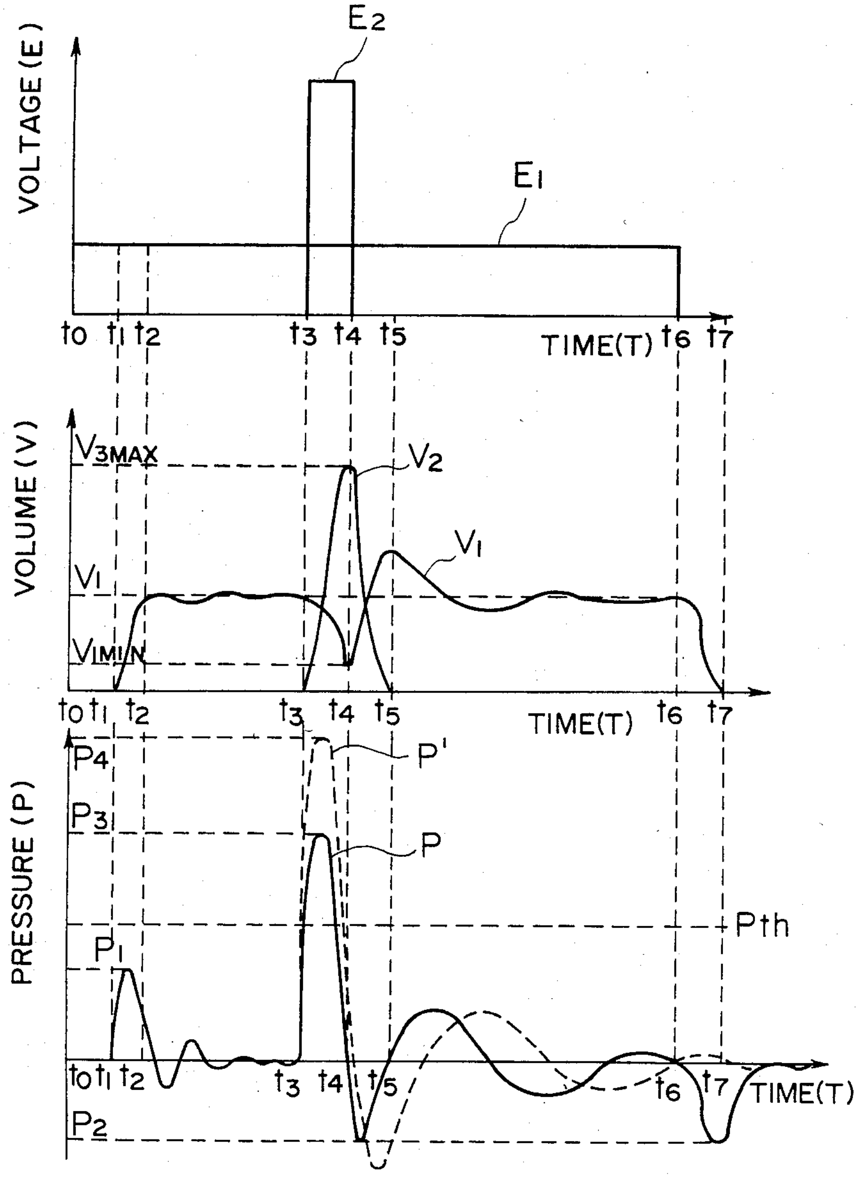
FIGS. 3A and 3B illustrate Example 1 of the present invention.

FIG. 3A is a timing chart showing a signal input to the electro-thermal converting member, a variation in the volume of bubbles generated thereby, and a variation in the pressure in the liquid flow paths.

As shown in FIG. 3A, when an electric pulse $E_1$ is imparted to the bubble generating member 120 at time $t_0$, bubbles begin to be generated on the thermal acting portion at time $t_1$ and the volume $V_1$ of the bubbles becomes maximum at time $t_2$. Between these times $t_1$ and $t_2$, the pressure P in the liquid flow paths becomes a positive pressure and has a maximum value $P_1$. Assuming that this maximum value $P_1$ is a value which does not exceed the energy $P_{th}$ necessary for discharge, flight of drops of liquid from the orifices does not occur due to this generation of bubbles. Subsequently, when an electric pulse $E_2$ is imparted to the bubble generating member 102 at time $t_3$, bubbles begin to be generated on the thermal acting portion and the volume $V_2$ of the bubbles becomes maximum at time $t_4$. In the meantime, the volume $V_1$ of the bubbles for absorbing the discharge energy decreases because the pressure P in the liquid flow paths increases. Thus, as compared with the maximum value $P_4$ of the pressure P′ in the liquid flow paths when the bubbles for absorbing the discharge energy are not present, the maximum value $P_3$ of the pressure P in the liquid flow paths when such bubbles are present becomes a low value. That is, the energy for discharge decreases. Further, when the electric pulse $E_2$ is eliminated (is cut off) at time $t_4$, the volume $V_2$ of bubbles begins to decrease and disappears at time $t_5$. Thereafter, when the electric pulse $E_1$ is eliminated at time $t_6$, the volume $V_1$ of bubbles begins to decrease and disappears at time $t_7$.

Figure 4:
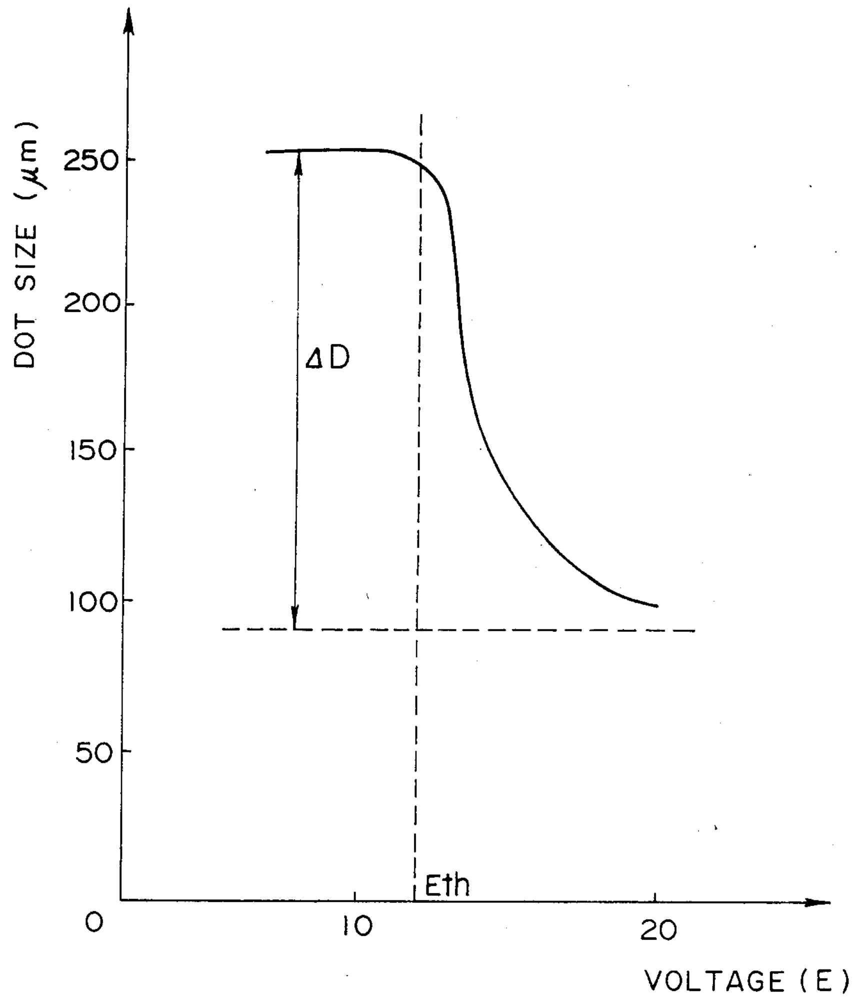
FIG. 4 illustrates the effect of Example 1 of the present invention.

FIG. 4 shows the correlation between the voltage of the electric pulse $E_1$ when, in the liquid injection recording apparatus of the present invention wherein such a driving method for tone control can be carried out, the voltage of the electric pulse $E_2$ is 30 V and the pulse width thereof is 10 $\mu$S and the pulse width of the electric pulse $E_1$ is 50 $\mu$S and the difference between the times when the electric pulses $E_1$ and $E_2$ are applied is 20 $\mu$ and the dot diameter of the discharged drops of liquid when they adhere to the recording medium.

When the applied voltage of the electric pulse $E_1$ exceeded 12 V, bubbles began to be generated on the thermal acting portion and the dot size (dot diameter) of the drops of liquid adhering the recording medium began to decrease (the applied voltage of the electric pulse $E_1$ at which such a phenomenon appears will hereinafter be referred to as $E_{th}$). As the voltage E greater than $E_{th}$ imparted to the bubble generating member 120 increased, the dot size decreased. The difference $\Delta D$ between the maximum and the minimum of the dot size reached 150 $\mu$m. This difference $\Delta D$ corresponded to the modulation range of the optical average reflection density values of 0.6–1.4 when printing was effected with a content of dye of 3% by weight and a dot density of 5 pel.

In Table 1 below, the modulation range of the optical average reflection density when three different liquids (inks) having dye contents of 3 wt.%, 1.5 wt.% and 0.5 wt.%, respectively, were used with the above-described recording head and the modulation range of the optical average reflection density when the value of the voltage imparted to the electro-thermal converting member in the recording head of the prior art was varied are shown at the maximum and minimum values of said density.

TABLE 1

| | Dye concentration | Optical average reflection density | |
|---|---|---|---|
| | | Minimum value | Maximum value |
| Prior Art | 0.5 wt. % | 0.5 | 0.8 |
| | 1.5 wt. % | 0.65 | 1.1 |
| | 3.0 wt. % | 0.8 | 1.4 |
| Present invention | 0.5 wt. % | 0.2 | 0.8 |
| | 1.5 wt. % | 0.35 | 1.1 |
| | 3.0 wt. % | 0.4 | 1.4 |

As is shown in Table 1, in respect of the maximum density of the recording medium, no difference was recognized between the present invention and the prior art, but in respect of the minimum density (the density when printing could be done most thinly, except the case where no drop of liquid flew), the present invention exhibited a remarkably small value. That is, the present invention has a modulation range about twice as great as that of the prior art and therefore can accomplish wider tone control. Further, a similar effect was obtained by a driving method in which the time $t_6$ when the electric pulse $E_1$ by said driving method is switched off is the same as the time $t_0$ when the next pulse is switched on and a voltage is always applied to the bubble generating member 120.

Also, the shape of the electric pulse $E_1$ need not be rectangular but may be smooth. The voltage may be varied between the time $t_0$ and the time $t_6$.

The present invention could also be applied to a so-called L-type discharge head in which the direction of discharge of drops of liquid was perpendicular to the direction of supply of ink, as shown in FIG. 2B.

Further, more delicate tone control than in the afore-described embodiments could be accomplished in a recording head wherein a number of bubble generating portions are in communication with the liquid flow paths 126, as shown in FIG. 2C.

Figure 3B:
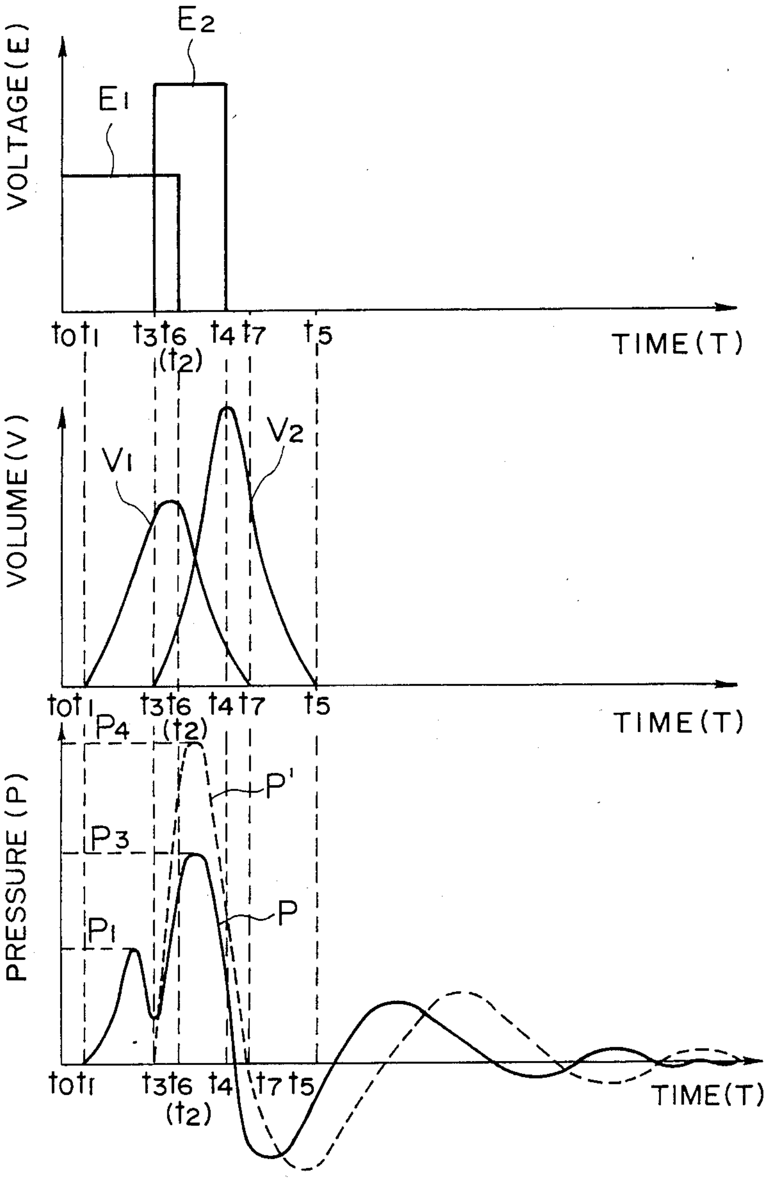

An effect similar to that obtained by the previous embodiment could also be obtained by a driving method in which, as shown in FIG. 3B, the bubbles $V_2$ are grown by the electric pulse $E_2$ between the time $t_6$ to $t_7$ during which the bubbles $V_1$ generated by the electric pulse $E_1$ disappear and the pressure in the liquid flow paths becomes a negative pressure, and the liquid discharge energy is adjusted during that time to thereby accomplish tone control.

EXAMPLE 2

A liquid injection recording apparatus of a structure similar to that of the fourth embodiment was made in the following manner and images were actually formed and evaluated.

First, a layer of $SiO_2$ (the lower layer) was formed to a thickness of 3 μm on a silicon substrate by sputtering and subsequently, as a heat generating resistance layer, Hf $B_2$ was layered to a thickness of 1000 Å and as an electrode, aluminum was layered to a thickness of 3000 Å, whereafter a heat generating resistance member pattern was formed by selective etching. Next, a layer of $SiO_2$ as a protective layer (the upper layer) was formed to a thickness of 0.5 μm by sputtering and an electro-thermal converting member was formed on the substrate, whereafter photosensitive resin was laminated on the substrate, and the photosensitive resin was exposed to light and developed by a predetermined pattern, whereby liquid flow paths, a liquid supply chamber and a discharge energy adjusting chamber were formed, and a glass plate formed with a hole having a diameter of 1 mm was joined thereto. Subsequently, the end surfaces of orifices were polished so that the distance between the tip end of the heat generating resistance member and the orifices was 300 μm and thus, a recording head was completed. Images were recorded and evaluated by applying a rectangular voltage pulse printing signal to the electro-thermal converting member while supplying ink composed chiefly of a black dye and ethanol to the thermal acting portion of this recording head at a back pressure of 0.01 atmospheric pressure.

A specific example of the tone control method will hereinafter be described with the fourth embodiment taken as an example.

Figure 7A:
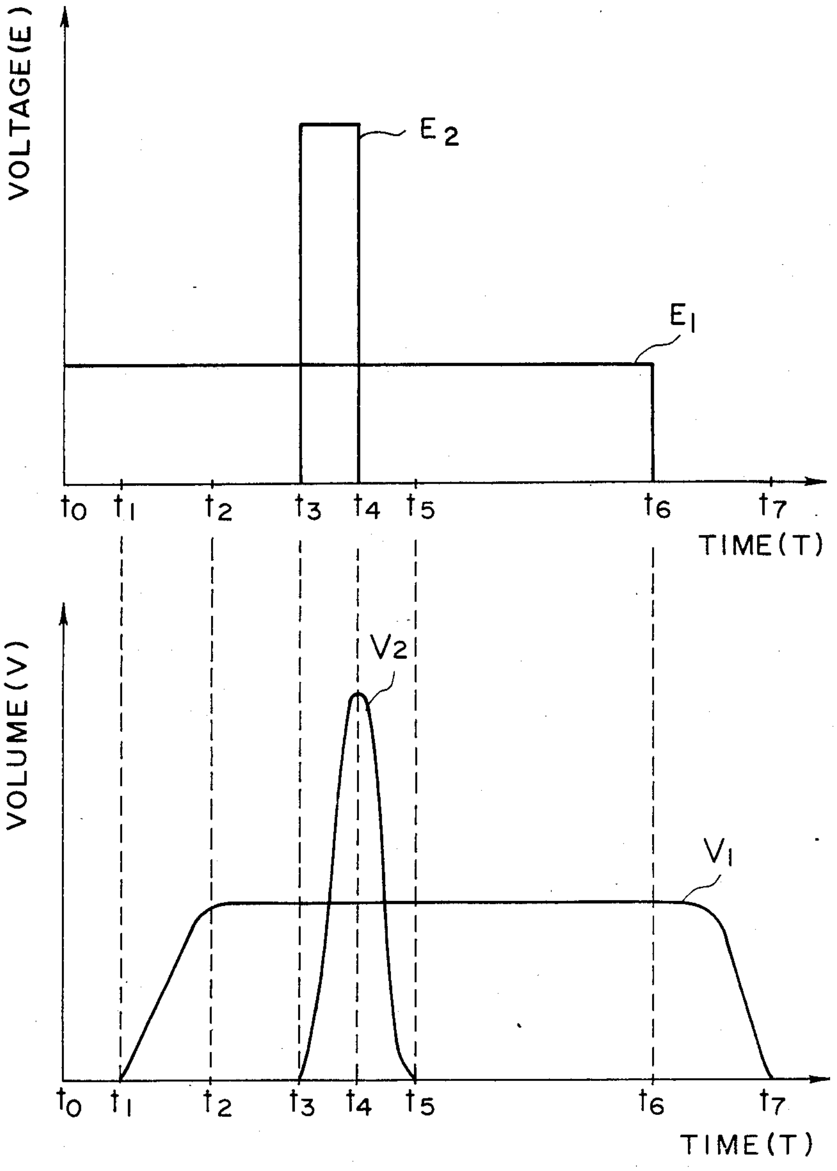
FIGS. 7A and 7B illustrate Example 2 of the present invention.

FIG. 7A is a timing chart showing the signal input to the electro-thermal converting member and a variation in the volume of bubbles generated thereby.

As shown in FIG. 7A, when an electric pulse $E_1$ is imparted to the bubble generating member 120 at time $t_0$, bubbles begin to be generated on the thermal acting portion at time $t_1$ and the volume $V_1$ of the bubbles becomes maximum at time $t_2$. Thus, in the flow paths 129 and the fine flow paths 127, the liquid resistance increases due to the bubbles generated. When an electric pulse $E_2$ is imparted to the bubble generating member 102 at time $t_3$ when the bubble $V_1$ is present in the flow paths 129, bubbles begin to be generated on the thermal acting portion and the pressure in the liquid discharge portion begins to rise. Almost all of this pressure is transmitted to the orifices 105 and the small openings 128, but since the bubble $V_1$ is present in the fine flow paths 127, the liquid resistance is great and the rate at which the energy by the bubble $V_2$ is transmitted to the orifices 105 increases and consequently, the discharge energy of drops of liquid increases. Further, when the electric pulse $E_2$ is switched off at time $t_4$, the volume $V_2$ of the bubbles begins to decrease and disappears at time $t_5$. Thereafter, when the electric pulse $E_1$ is switched off at time $t_6$, the volume $V_1$ of the bubbles begins to decrease and disappears at time $t_7$. The volume $V_1$ of the bubbles can be adjusted by varying the electric pulse $E_1$, and this means that the discharge energy can be adjusted. Accordingly, tone control could be accomplished by adjusting the electrical energy imparted to the bubble generating member 120.

Figure 8:
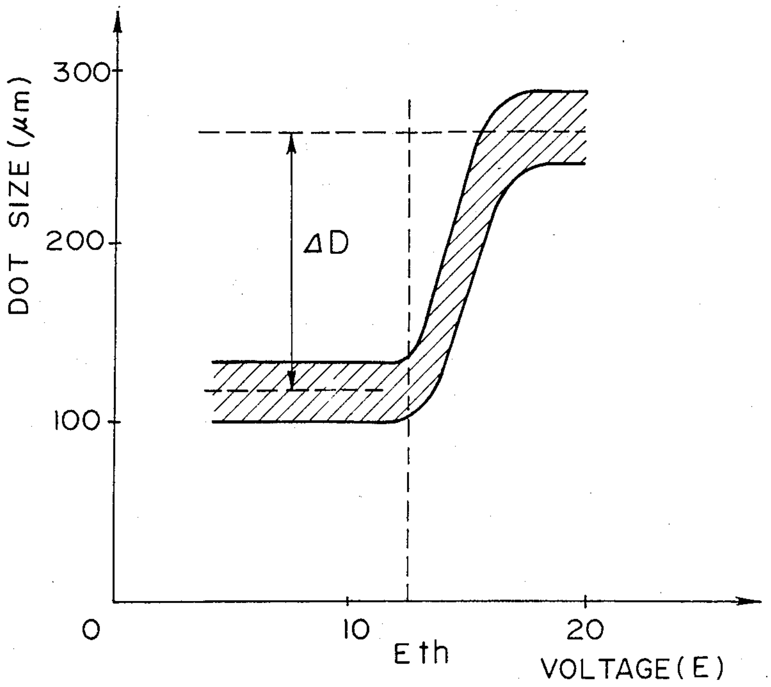
FIG. 8 illustrates the effect of Example 2 of the present invention.

FIG. 8 shows the correlation between the voltage of the electric pulse $E_1$ in the liquid injection recording apparatus to which such a driving method is applicable when the voltage of the electric pulse $E_2$ is 30 V and the pulse width thereof is 10 μS and the pulse width of the electric pulse $E_1$ is 50 μS and the difference between the time when the electric pulse $E_1$ is applied and the time when the electric pulse $E_2$ is applied is 20 μS and the dot diameter of the discharged drops of liquid when they adhere to the recording medium. In FIG. 8, the width indicated by hatching represents the irregularity of the dot size.

When the applied voltage of the electric pulse $E_1$ exceeded 12 V, bubbles began to be generated on the thermal acting portion and the dot size (dot diameter) of the drops of liquid adhering to the recording medium began to decrease (the applied voltage of the electric pulse $E_1$ at which such a phenomenon appears will hereinafter be referred to as $E_{th}$. As the voltage greater than $E_{th}$ imparted to the bubble generating member 120 increases, the dot size increases. The difference ΔD between the maximum and the minimum of the dot size reached 150 μm. This difference ΔD corresponded to the modulation range of the optical average reflection density values of 0.6–1.4 when printing was effected with a content of dye of 3% by weight and a dot density of 5 pel.

In such a driving method, an effect similar to what has been described above was recognized even if the time $t_6$ when the electric pulse $E_1$ is switched off was the same as the time $t_0$ when the next electric pulse $E_1$ is switched on and a voltage was always applied to the electro-thermal converting member 115.

Also, the shape of the electric pulse $E_1$ need not be rectangular but may be a smoothly variable shape, and the voltage may be varied between the time $t_0$ and the time $t_6$.

A similar effect of the present invention was recognized also in a so-called L-type discharge recording apparatus wherein the direction of discharge is perpendicular to the direction of supply of liquid as in the fifth embodiment shown in FIG. 6B.

Further, the present invention could provide a liquid injection recording apparatus in which more delicate tone control can be accomplished by a recording head in which a number of bubble generating portions 117 are in communication with the liquid flow paths 126 as in the sixth embodiment shown in FIG. 6C.

Table 2 below shows the maximum and minimum values of the optical average reflection density of recorded image when liquids (inks) having dye contents of 3% by weight, 1.5% by weight and 0.5% by weight, respectively, were used with apparatuses in which the discharge energy adjusting chamber comprising a flow path bubble generating portion, a fine flow path, a small opening and a bubble generating member is provided at three locations, two locations and one location and the apparatus of the prior art in which no such chamber is provided. In the apparatus of the prior art in which the adjusting chamber is not provided, the variation in density was accomplished by varying the voltage applied to the electro-thermal converting member. In the apparatuses wherein the adjusting chamber is provided, density adjustment was accomplished by varying the aforementioned electric pulse $E_1$.

TABLE 2

| Number of adjusting chambers | Dye concentration | Optical average reflection density | |
|---|---|---|---|
| | | Minimum value | Maximum value |
| 0 | 0.5 wt. % | 0.5 | 0.8 |
| | 1.5 wt. % | 0.65 | 1.1 |
| | 3.0 wt. % | 0.8 | 1.4 |
| 1 | 0.5 wt. % | 0.3 | 0.8 |
| | 1.5 wt. % | 0.4 | 1.1 |
| | 3.0 wt. % | 0.5 | 1.4 |
| 2 | 0.5 wt. % | 0.25 | 0.85 |
| | 1.5 wt. % | 0.35 | 1.15 |
| | 3.0 wt. % | 0.45 | 1.4 |
| 3 | 0.5 wt. % | 0.2 | 0.85 |
| | 1.5 wt. % | 0.3 | 1.15 |
| | 3.0 wt. % | 0.4 | 1.45 |

As can be seen from Table 2, the controllability of density of recorded image has been remarkably improved by the present invention. Particularly, the provision of more adjusting chambers has led to the greater effect of the present invention. The density adjustment range has been enlarged by about twice as compared with that in the prior art.

Figure 7B:
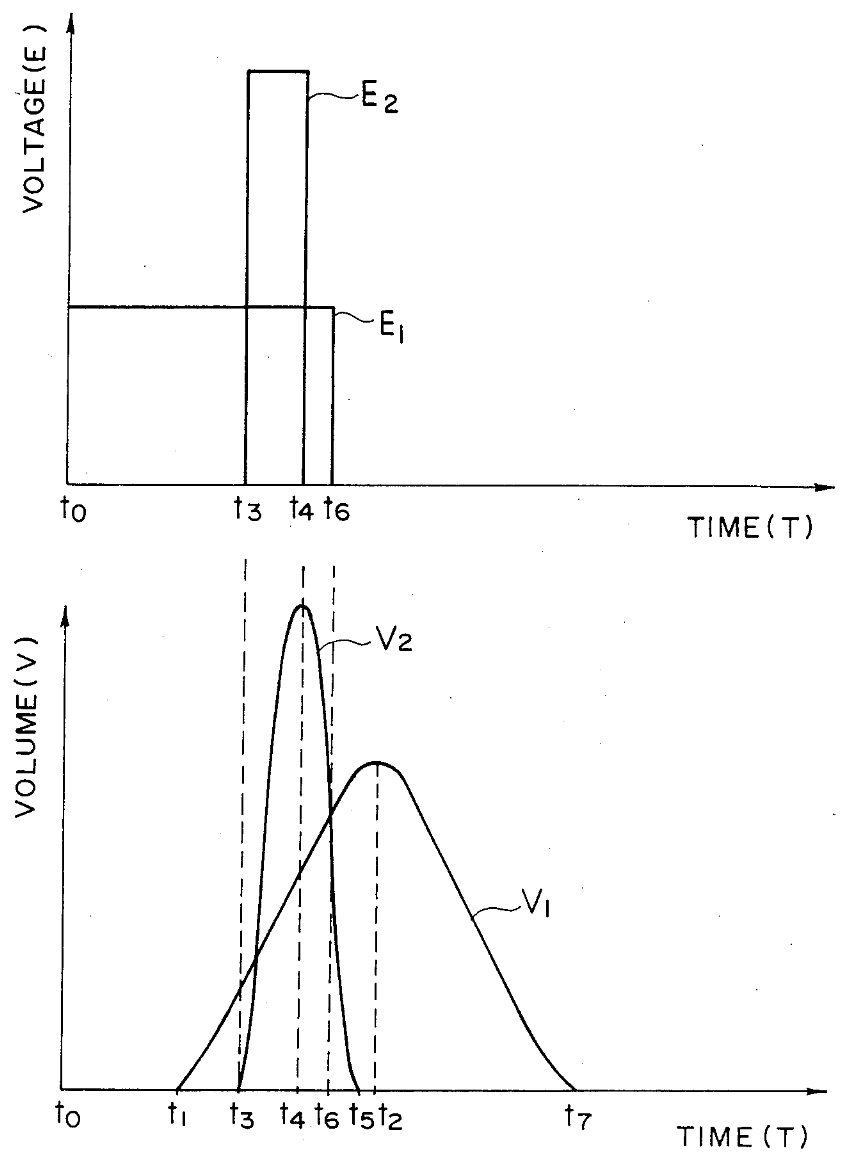

It has been possible to adjust the discharge energy also by causing the bubble $V_2$ to grow by the electric pulse $E_2$ when the pressure in the liquid flow paths is increased or decreased by the bubble $V_1$ generated by the electric pulse $E_1$ as shown in the timing chart of FIG. 7B which represents the timing at which power is supplied to the electro-thermal converting member and the variation in the volume of the bubbles. Also, in this driving method, a wide range of density control could be accomplished.

What is claimed is:

1. A liquid injection recording apparatus comprising:

an orifice for discharging liquid and forming flying drops of liquid, a liquid flow area communicating with said orifice, liquid drop forming means in said liquid flow area for generating energy to create pressure in said liquid flow area to discharge flying drops of liquid from said orifice, at least one side chamber disposed to the side of said liquid flow area and in communication therewith through a passage opening only to said side chamber and said liquid flow area, and bubble generating adjusting means in said side chamber for generating a bubble in said side chamber having a controlled size to control the pressure in said liquid flow area via said passage so as to control the size of the discharged drop of liquid.

2. A liquid injection recording apparatus comprising:

an orifice for discharging liquid and forming flying drops of liquid, a liquid flow area communicating with said orifice, liquid drop forming means in said liquid flow area for generating energy to create pressure in said liquid flow area to discharge flying drops of liquid from said orifice, a plurality of said chambers in communication with and disposed to one or both sides of said liquid flow area, and bubble generating adjusting means for generating bubbles to adjust the discharging force.

3. A liquid injection recording apparatus according to claim 2, wherein said liquid drop forming means is provided along the longitudinal direction of said liquid flow area.

4. A liquid injection recording apparatus according to claim 2, said side chambers are provided on both sides of said liquid flow area with respect to the longitudinal direction thereof.

5. A liquid injection recording apparatus according to claim 2, wherein said liquid drop forming means includes means for generating bubbles.

6. A liquid injection recording apparatus according to claim 5, wherein said means for generating bubbles includes an electro-thermal converting member.

7. A liquid injection recording apparatus according to claim 2, wherein said bubble generating adjusting means includes an electro-thermal converting member.

8. A liquid jet recording apparatus according to claim 2, wherein said side chambers communicates at one portion with said liquid flow area through a flow path and at another portion with a small opening in communication with the atmosphere.

9. A liquid jet recording method comprising the steps of:

providing a liquid jet recording device including an orifice for discharging liquid and forming flying drops of liquid, a liquid flow area communicating with the orifice, liquid drop forming means in the liquid flow area for generating energy when driven to create pressure in the liquid flow area to discharge flying drops of liquid from the orifice, a discharge energy adjusting chamber in communication with the liquid flow area, and bubble generating adjusting means in the discharge energy adjusting chamber for generating bubbles when driven;

initiating driving of the liquid drop forming means during a period in which the bubble generating adjusting means is driven; and controlling the size of the bubble generated by the bubble generating adjusting means in the discharge energy adjusting chamber to control the pressure in the liquid flow area so as to control the size of the discharged drop of liquid.

10. A liquid jet recording method according to claim 9, wherein driving of the bubble generating adjusting means is terminated during a period in which the liquid drop forming means is driven.

11. A liquid jet recording method according to claim 9, wherein driving of the bubble generating adjusting means is terminated after driving of the flying liquid drop forming mean is terminated.

12. A liquid jet recording method according to claim 9, wherein the liquid drop forming means and the bubble generating adjusting means are driven by electrical pulses and the voltage of an electric pulse for driving the bubble generating adjusting means is lower than the voltage of an electrical pulse for driving the liquid drop forming means.

13. A liquid jet recording method according to claim 9, wherein the liquid drop forming means includes an electro-thermal converting member.

14. A liquid jet recording method according to claim 9, wherein the bubble generating adjusting means includes an electro-thermal converting member.

15. A liquid jet recording method according to claim 9, wherein the discharge energy adjusting chamber communicates at one portion thereof with the liquid flow area through a flow path and at another portion thereof with a small opening in communication with the atmosphere.

* * * * *

UNITED STATES PATENT AND TRADEMARK OFFICE

CERTIFICATE OF CORRECTION

PATENT NO. : 4,646,110

DATED : February 24, 1987

INVENTOR(S) : MASAMI IKEDA, ET AL.

It is certified that error appears in the above-identified patent and that said Letters Patent is hereby corrected as shown below:

COLUMN 1

Line 20, "to devises" should read --devised,--.
Line 41, "drop-on demand" should read --drop-on-demand--.
Line 66, "ments" should read --ment--.

COLUMN 2

Line 38, "the" should read --for--.
Line 44, "from" should read --flow--.
Line 50, "gere-" should read --gene- --.

COLUMN 3

Line 2, "portion" should read --portions--.
Line 12, "transvers" should read --transverse--.

COLUMN 4

Line 43, "portion" should read --surface--.

COLUMN 12

Line 62, "flew" should read --was emitted--.

UNITED STATES PATENT AND TRADEMARK OFFICE
CERTIFICATE OF CORRECTION

PATENT NO. : 4,646,110

DATED : February 24, 1987

INVENTOR(S) : MASAMI IDEDA, ET AL.

It is certified that error appears in the above-identified patent and that said Letters Patent is hereby corrected as shown below:

COLUMN 16

Line 11, "said" should read --side--.
Line 34, "communicates" should read --communicate--.
Line 68, "mean" should read --means--.

Signed and Sealed this

Eighth Day of September, 1987

Attest:

DONALD J. QUIGG

*Attesting Officer* *Commissioner of Patents and Trademarks*